(No Model.) 2 Sheets—Sheet 2.
S. M. STEVENSON.
SELF LOADING DIRT CART.
No. 416,964. Patented Dec. 10, 1889.
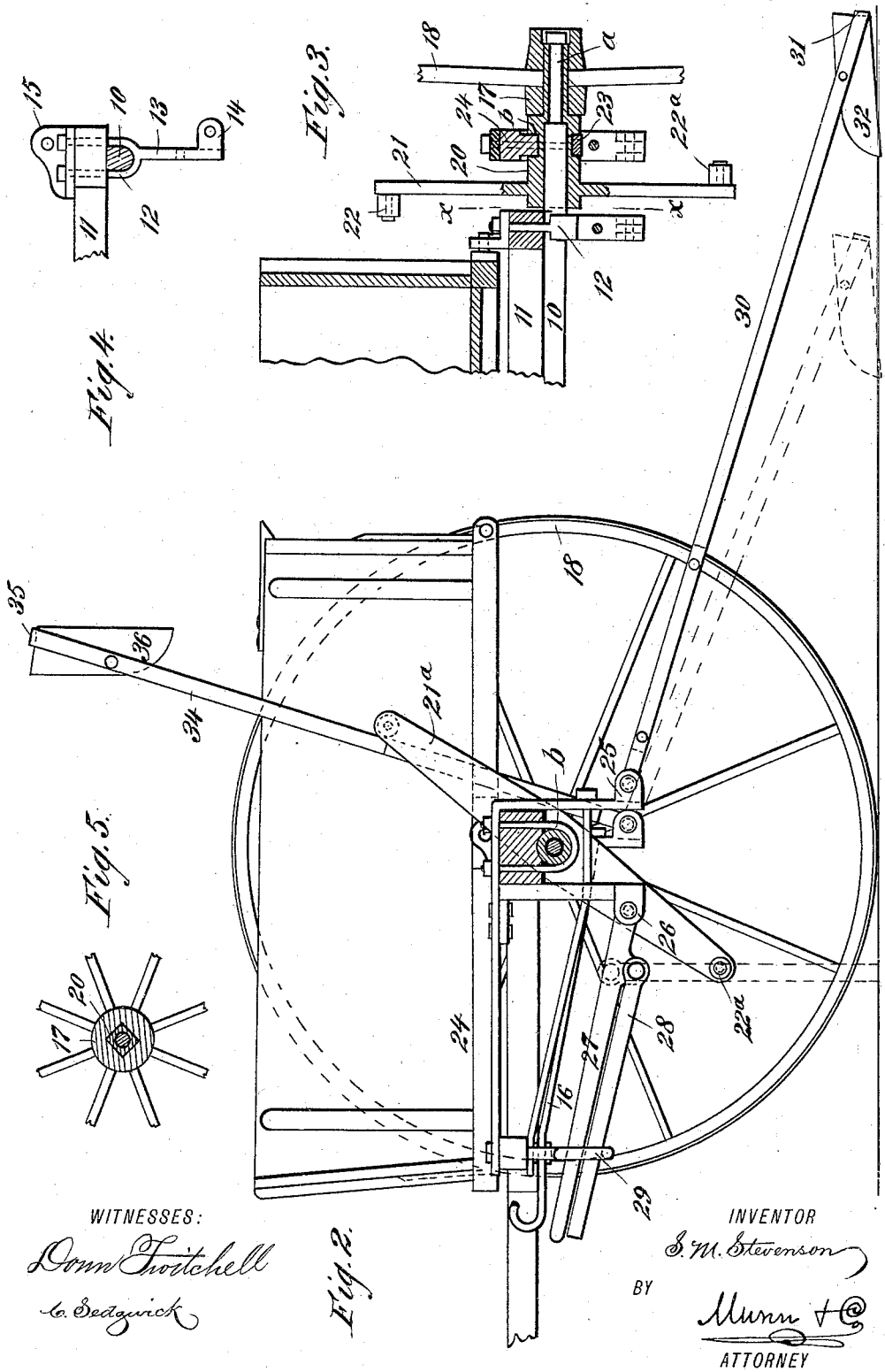
WITNESSES:
Donn Twitchell
C. Sedgwick
INVENTOR
S. M. Stevenson
BY
Munn & Co
ATTORNEY

# UNITED STATES PATENT OFFICE.

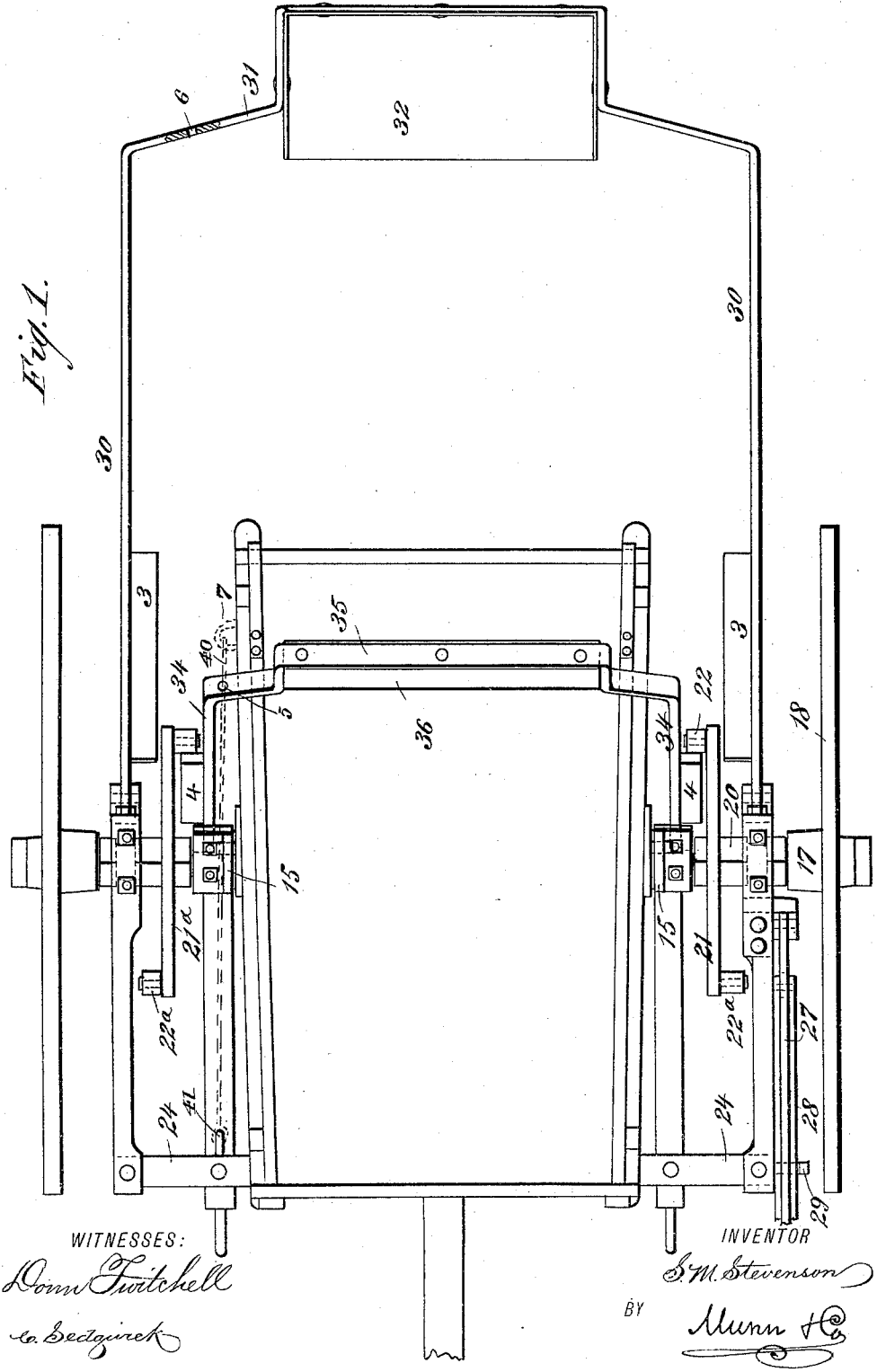

SAMUEL MAHAN STEVENSON, OF BASTROP, LOUISIANA.

SELF-LOADING DIRT-CART.

SPECIFICATION forming part of Letters Patent No. 416,964, dated December 10, 1889.

Application filed March 28, 1889. Serial No. 305,125. (No model.)

*To all whom it may concern:*

Be it known that I, SAMUEL MAHAN STEVENSON, of Bastrop, in the parish of Morehouse and State of Louisiana, have invented a new and Improved Self-Loading Dirt-Cart, of which the following is a full, clear, and exact description.

My present invention relates to dirt-carts of the class illustrated, described, and claimed in Letters Patent of the United States No. 366,043, granted to me on the 5th day of July, A. D. 1887, the object of the present invention being to distribute the strain incident to the raising of the loading-scoops.

To the end named the invention consists, essentially, of scoops that are rigidly connected to two pivotally-mounted and rearwardly-extending levers that are formed with side flanges, in combination with double lever-arms that are rigidly connected to the wheel-boxes, all as will be hereinafter more fully described, and specifically pointed out in the claims.

Reference is to be had to the accompanying drawings, forming a part of this specification, in which similar figures and letters of reference indicate corresponding parts in all the views.

Figure 1 is a plan view of a cart embodying my invention, the parts being represented as they appear just after the forward scoop has discharged its load. Fig. 2 is a sectional view taken just inside of the right-hand wheel, the parts being represented as they appear in Fig. 1. Fig. 3 is a sectional view taken upon a line with the vehicle-axle. Fig. 4 is a cross-sectional view on line $x\,x$ of Fig. 3, and Fig. 5 is a detail view illustrating the construction of the wheel-box.

In the drawings, 10 represents the cart-axle, which supports the frame 11, the frame being held to the axle by clips 12, that are formed with downwardly-extending arms 13, that are provided with apertured ears 14. The clip-arms extend upward through the frame 11 and there engage brackets 15, that are apertured to receive the cart-body trunnions, the cart being held in the position in which it is shown in the drawings by any proper fastening device. The arms 13 are braced by rods 16, which extend forward and are secured to the forward portion of the frame 11.

The journals $a$ of the axle 10 are made much longer than usual in order that they may receive boxes 20, which extend inward from the hubs 17 of the wheels 18. At a point near the inner ends of the boxes 20 there are secured double-armed levers 21 and 21ª, said levers carrying laterally-extending anti-friction rolls 22 and 22ª, and in order that the boxes 20 may be properly supported I form such boxes with recesses $b$, which said recesses are entered by U-straps 23, the straps being secured to auxiliary side frames 24, said frames being arranged as clearly shown in the drawings. Both of the frames 24 are provided with rearwardly-extending projections 25, and one of the frames (the left-hand frame in this case) is provided with a forwardly-extending projection 26, to which projection there is pivotally connected a lever 27, to which lever I pivotally connect a standard 28, the parts being normally held in the position in which they are shown in full lines in Figs. 1 and 2 by a hook 29, which extends downward from the forward portion of the left-hand frame 24.

To the projections 25, I pivotally connect rearwardly-extending levers 30, said levers being in turn connected by a cross-bar 31, that is bent to receive a scoop 32, and to the projections 14 of the arms 13, I connect rearwardly-extending levers 34, that are connected by a cross-bar 35, which said cross-bar serves as the support for a second scoop 36. To the levers 30, I secure inwardly-extending flanges 3, and to the levers 34, I secure outwardly-extending flanges 4, the flanges 3 being arranged in the lines of travel of the anti-friction rolls 22ª, while the flanges 4 are arranged in the lines of travel of the anti-friction rolls 22.

The wheel-hub 17 is connected to the box 20 in a manner such that the box must necessarily turn with the wheel, and in practice I prefer to make that section of the box which enters the hub square or of irregular form. In the drawings I have represented said section of the hub as being square.

In operation as the cart is drawn forward the flanges of the levers 30 and 34 will be alternately engaged by the anti-friction rolls 22ª and 22, and as the rolls bear upon the flanges the levers will be raised to the position in which the levers 34 are shown in full lines in Figs. 1 and 2. Just as the levers reach the position in which they are shown in the figures last above referred to the anti-friction rolls 22 will pass from engagement with the flanges 4, and the levers will drop back to the position indicated by dotted lines in Fig. 2, and as the levers 34 are so returning to the position indicated in Fig. 2 the rolls 22ª will bear against the flanges 3 and the levers 30 will be raised, the contents of the scoops being dumped as the scoops pass above the cart-body, as will be readily understood. In order that the flanges carried by the levers may be held out of the paths traveled by the anti-friction rolls carried by the levers 21 and 21ª, I provide hooks 40, that are connected to an eye 41 and arranged so that they may be brought into engagement with apertures 5 and 6, that are formed in the cross-bars 31 and 35, the hooks being supported by an eye 7 when not employed to uphold the levers.

When the construction above described is in operation, it is necessary that the levers 21 and 21ª should be aligned and move in unison, and it is in order that a proper alignment may be brought about that I have provided the lever 27 and the standard 28, the arrangement being such that by lowering the standard to the position in which it is shown in Fig. 2 and pressing down upon the lever 27, I am able to raise the left-hand lever and turn it so as to bring its lever 21 into register with the lever 21ª.

Having thus described my invention, I claim as new and desire to secure by Letters Patent—

1. The combination, with a cart, of pivotally-mounted levers provided with laterally-extending flanges and carrying scoops, and levers having lateral projections, said levers being carried by the wheel-boxes, substantially as described.

2. The combination, with a cart, of pivotally-mounted levers formed with laterally-extending flanges and carrying scoops, and levers rigidly connected to the wheel-boxes and provided with laterally-extending anti-friction rolls, substantially as described.

3. The combination, with a cart, of pivotally-mounted levers having laterally-extending flanges, scoops carried by the levers, boxes mounted upon the axle-journals and rigidly connected to the wheel-hubs, auxiliary frames by which the boxes are supported, and levers rigidly connected to the boxes and provided with lateral projections arranged to engage the lever-flanges, substantially as described.

SAMUEL MAHAN STEVENSON.

Witnesses:
J. LEE PELLET,
WM. DAY.